Oct. 19, 1937.  E. J. SEIDEN  2,096,069
SIGNALING SYSTEM
Filed June 11, 1934   2 Sheets-Sheet 1

Inventor
Elmer J. Seiden
By Bearman + Langford
Attorney

Oct. 19, 1937.  E. J. SEIDEN  2,096,069
SIGNALING SYSTEM
Filed June 11, 1934  2 Sheets-Sheet 2

Inventor
Elmer J. Seiden
By Beaman + Langford
Attorney

Patented Oct. 19, 1937

2,096,069

UNITED STATES PATENT OFFICE 2,096,069

SIGNALING SYSTEM

Elmer J. Seiden, Jackson, Mich.

Application June 11, 1934, Serial No. 729,963

4 Claims. (Cl. 177—337)

This invention relates to a system of signals for automotive vehicles giving a complete indication as to the state of operation of the machine and particularly to such a system which is under control of the accelerator, the brake and the movement of the vehicle.

The conventional stop light is unsatisfactory for the reason that it does not give sufficient indication as to the state of operation of the vehicle. The stop light does not flash until the brakes actually have been applied. This warning is often insufficient to permit the operator of the following vehicle to stop in time to avoid an accident.

An object of this invention is to overcome the above named disadvantages by providing a signaling system for automotive vehicles which indicates, for the benefit of a following vehicle, the state of operation of the first vehicle.

Another object is to provide a signaling system which not only indicates the instant the brakes are applied but further indicates, by a different signal, the raising of the foot from the accelerator and by still a different signal the placing of the foot on the accelerator.

Still another object of this invention is to provide a switch which automatically is maintained closed while the vehicle is moving and automatically is maintained open when the vehicle is stopped, the switch being of general application, however, and not limited to use in a signaling system.

A further object is to provide a switch operated from a moving part of a machine by the drag of a film of oil, or other suitable liquid.

A further object of this invention is to provide a two way lever operated switch controlling two circuits, one of which opens when the other closes and vice versa.

Figures 1, 5:
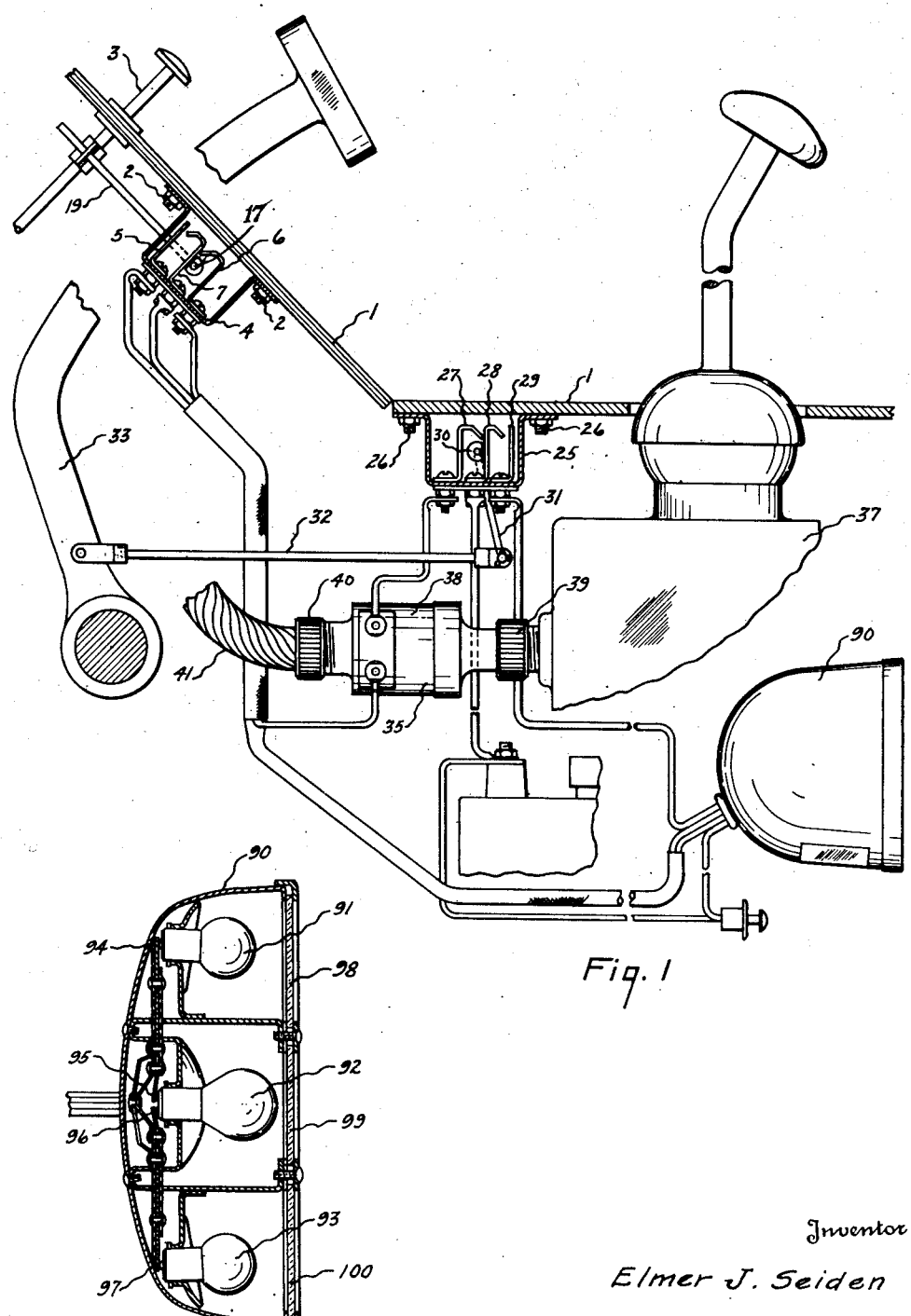
Figure 2:
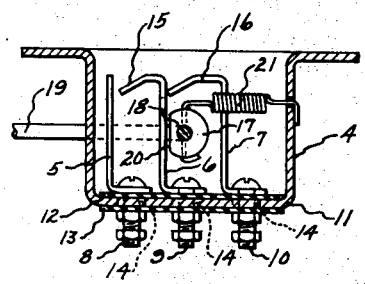
Figure 4:
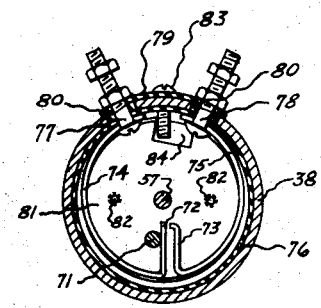
Figure 3:
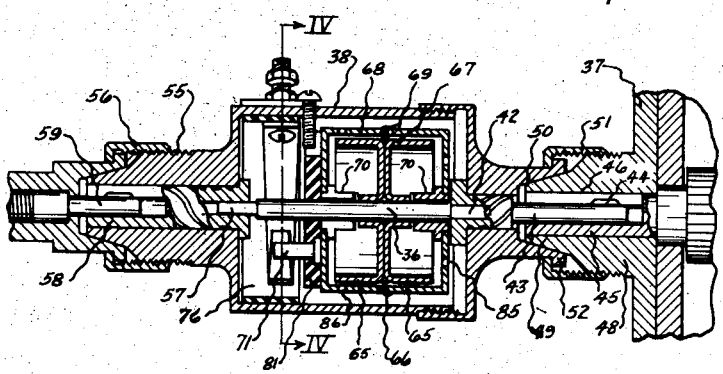
Figure 6:
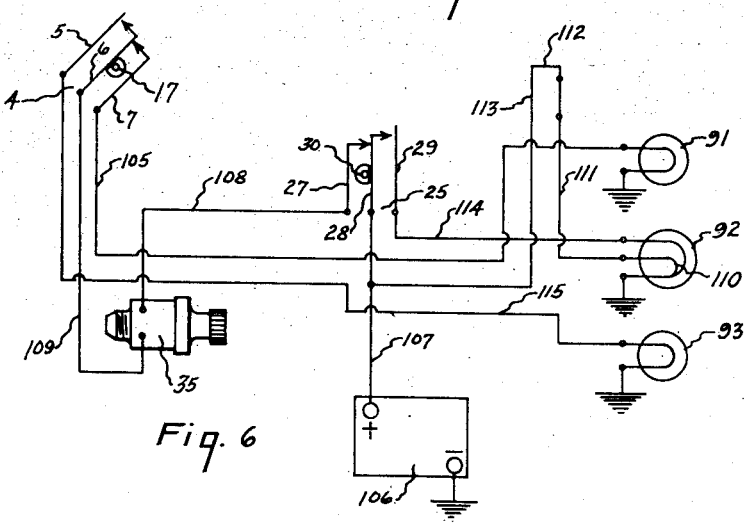

These and other objects will be apparent in the following specification when taken with the accompanying drawings, in which, Fig. 1 is a schematic diagram of an automotive vehicle having the mechanisms of the signaling system secured thereto in their relative positions, Fig. 2 is a sectional elevation of the accelerator switch used in the system taken through one side of the center thereof, Fig. 3 is a sectional elevation of the motion responsive switch, Fig. 4 is a section of the line IV—IV of Fig. 3, Fig. 5 is a horizontal section through the signal light housing, and Fig. 6 is a wiring diagram of the system.

Briefly the signaling system, according to this invention, embodies a plurality of lighting circuits for operating different signal lights under the control of switches controlled by movement of the brake, the accelerator and the vehicle itself.

Referring particularly to Fig. 1, the reference character 1 indicates a floor board of an automotive vehicle. Secured to the floor board 1 by bolts 2 and adjacent the accelerator 3 is the accelerator switch 4 having three resilient contact strips 5, 6 and 7. As shown particularly in Fig. 2 wherein the accelerator switch 4 is disclosed in detail, the resilient strips 5, 6 and 7 are bolted by binding posts 8, 9 and 10, respectively, to the casing 11; the binding posts and the resilient strips 5, 6 and 7 being suitably insulated from the casing 11 by the insulating sheets 12 and 13 and the insulating washers 14 disposed in holes stamped in the casing 11. The free ends of the resilient strips 6 and 7 are bent over into contacts 15 and 16. Disposed between the resilient strips 6 and 7 is a cam 17 mounted for oscillation with the shaft 18 which is in turn connected to and adapted to be oscillated by the lever 19 pivotally connected to the accelerator 3.

The contact 16 and the resilient strip 6 are normally resiliently maintained in engagement completing the circuit in which they are included. In normal position the flat face 20 of the cam 17 is parallel to the resilient strip 6 and out of contact therewith. As will be apparent from Fig. 2, the lowering of the left end of the lever 19 by stepping on the accelerator 3 oscillates the cam 17 to bring it into engagement, against the action of the spring 21 eccentrically connected to the cam 17 and anchored in the casing 11, with the resilient strip 6, to cam it out of engagement with the contact 16 on the resilient strip 7 and into engagement, through the contact 15, with the resilient strip 5. This movement of the resilient strip 6 opens the circuit, including the resilient strips 6 and 7, and closes the circuit, including the strips 5 and 6.

Again referring to Fig. 1, the brake switch 25 is secured to the floor board 1 by bolts 26. The brake switch 25 is of the same construction as the accelerator switch 4 and has three contact strips 27, 28, 29, a cam 30, a crank arm 31 connected thereto and a connecting link 32 connecting the crank arm 31 to the brake lever 33. The spring strips 27 and 28 are normally resiliently urged together. Oscillation of the cam 30 by the action of the brake lever 33 laterally deflects the contact strip 28 from engagement with the contact strip 27 into engagement with the contact strip 29.

The motion responsive switch 35 is provided to close the circuit in which it is included when the vehicle is under way and to open the circuit when the vehicle stops. In the preferred form the switch 35 is disposed between the speedometer cable and some part of the mechanism of the vehicle movable only when the vehicle is under way. As shown the switch 35 has a rotatable shaft 36 which receives its rotary movement from the transmission 37. The casing 38 is provided on one end with a fitting 39 secured to the usual speedometer cable outlet in the transmission casing. The other end of the casing 38 is provided with a coupling 40 adapted to receive the speedometer cable 41. The switch 35 may be, of course, coupled in the speedometer driving connection whether it be taken with the transmission, the drive shaft or elsewhere. The switch 35 may also be driven from any other suitable moving part of the vehicle or may be separately driven by a wheel contacting with the ground. Obviously, other types of frictionally operated switches may be found suitable and will readily suggest themselves. Also suitable magnetically operated switches, and the like, energized by the rotation of a part may be employed in lieu of the switch 35. From this it is to be understood that the invention is not limited to any particular motion responsive switch.

Referring particularly to Fig. 3, wherein the switch 35 is shown in detail the shaft 36 has a squared end 42 over which is fitted the male connector 43 having a key 44. Extending from and driven by the transmission 37 is a female connector 45 having an axially extending slot 46 receiving the key 44, for receiving and driving the male connector 43 and consequently the shaft 36. The threaded fitting 48 through which the connectors 43 and 45 extend has a tapered end 49 which is received by the complementarily tapered recess 50 in the casing 38 of the switch 35. An internally threaded sleeve 51, secured to the casing 38 by the flange 52, couples with the fitting 48 for clamping the casing 38 to the transmission 37.

The opposite end of the shaft 36 is formed to the squared connecting member 57 which receives the female connector 58 which in turn receives for rotation therewith the male connector 59. The adjacent end of the casing 38 is provided with a fitting 55 corresponding to the fitting 48 and is adapted to be secured to the speedometer cable casing by the internally threaded rotatable sleeve 56. It will be apparent that the connections and fittings at each end of the housing 38 are alike and that the speedometer cable is driven through the shaft 36.

Within the housing 38 and press fitted or otherwise suitably secured to the shaft 36 are two oppositely extending cup shaped stampings 65 soldered or welded together at 66 to provide a cylinder 67 rotatable and concentric with the shaft 36. Freely mounted for oscillation on the shaft 36 and closely adjacent to the cylinder 67 is the second cylinder 68 also concentric with the shaft 36. The cylinder 68 preferably is formed of two sheet metal stampings soldered or welded together at 69. Radially extending ends of the cylinder 68 are press fitted or otherwise suitably secured to the bushings 70, which, in turn, are mounted on the shaft 36 for rotation thereon.

A pin 71 is secured to one end of the cylinder 68 in engagement with the resiliently mounted switch point 72. The switch point 73 is disposed adjacent the switch point 72, each of the switch points being mounted on resilient spring strips 74 and 75, respectively. The spring strips 74 and 75 are insulated from the casing 38 by the band of insulating material 76 and are secured to the housing 38 by binding posts 77 and 78. The binding posts are insulated from the casing 38 not only by the insulating band 76 but also by the insulating sheet 79 and the insulating washers 80 disposed in holes formed in the housing 38.

The spring strips 74 and 75 together with the contact points 72 and 73 are insulated from the cylinder 68 by the disc 81 of insulating material secured by cap screws 82 to one end of the cylinder 68. A cap screw 83 extends through the housing 38 and into a recess 84 in the insulating disc 81 and functions as a stop to limit the oscillatory movement of the cylinder 68.

The cylinder 68 is provided at one end with a series of perforations 85 and on its periphery near one end with perforations 86. The housing 38 and the cylinders 67 and 68 of the motion responsive switch 35 are filled with oil or other viscous fluid to a level somewhat below the shaft 36. As the shaft 36 is rotated upon forward movement of the vehicle, it rotates the cylinder 67. As the cylinders 67 and 68 are disposed closely together, the filament of oil therebetween operates in such a manner that rotary movement of the cylinder 67 exerts, through the oil film, a drag against the cylinder 68 and rotates it until it is stopped by the stop 83 engaging with one side of the recess 84 in the insulating disc 81. At the same time this rotation of the cylinder 68 carries with it the pin 71 which abuts against the switch point 72 and carries it into engagement with the switch point 73 to close the circuit in which the two switch points are included.

Circulation of the oil in the casing 38 and cylinder 68 is maintained by the action of the oil being centrifugally thrown out of the perforations 86 and flowing into the perforations 85 by gravity. The circulation of the oil is important in that it mixes the oil from different portions of the unit insuring a uniform oil consistency and uniform operation of the switch. The connectors 58 and 43 are spirally fluted adjacent the housing 38 in order that the oil within the cylinder 68 will be continuously directed inwardly during the rotation of the shaft 36. When the shaft 36 stops rotating the resiliency in the strips 74 and 75 to which the switch points 72 and 73 are connected, respectively, is sufficient to exert enough force against the pin 71 to rotate in a reverse direction the cylinder 68 whereby the switch points 72 and 73 move apart to open the circuit in which they are included.

The signal light housing 90 as shown in detail in Fig. 5 has signal lamps 91, 92 and 93. Each of the lamps are grounded to the casing and are also in engagement with contacts 94, 95, 96 and 97 for connection to the signaling system circuits as generally shown in Fig. 1 and as more particularly shown in the wiring diagram of Fig. 6.

Secured in the signal light housing 90 and disposed in front of the lamps 91, 92 and 93, respectively, are yellow, red and green lenses, respectively indicated by the reference characters 98, 99 and 100.

The operation is as follows: Referring to Fig. 1 in conjunction with the wiring diagram in Fig. 6 the position of the cam 17 of the accelerator switch 4 and the cam 30 of the brake switch 25 indicate that the operator's foot is neither on the accelerator nor on the brake lever. The contact strips 6 and 7 of the accelerator switch 4 and 27 and 28 of the brake switch 25 are thereby resiliently urged to engagement with each other respectively. Assuming that the automobile is moving, the desired signal to be given in this state of operation is one of warning. While it is true that the operator may have merely removed his foot from the accelerator for the purpose of slowing up to round a turn, for instance, it may be also true that he has removed his foot from the accelerator preparatory to applying it to the foot brake. The yellow signal lamp 91 is then lighted, the circuit being completed from the resilient strip 7 (Fig. 6) through the conductor 105 to the lamp 91, from the lamp 91 to the ground, from the ground to the storage battery 106, from the storage battery 106 through the conductor 107, through the resilient strips 28 and 27 of the brake switch 25, through the conductor 108 to the closed motion responsive switch 35 to the conductor 109 and back to the resilient strip 6 in engagement with the resilient strip 7 of the accelerator switch 4.

Assuming the above set of facts, with the exception that the vehicle be stopped instead of in motion, the motion responsive switch 35 would be open. The circuit including the yellow warning lamp 91 would be open and the only signal given would be the usual tail light comprising a small filament 110 located in the lamp 92. The tail light circuit comprises the conductor 111 and tail light switch 112, the conductor 113 which connects with the conductor 107 and is then connected with the storage battery 106.

Assume the accelerator to be still in the originally assumed position, the vehicle moving and the brake applied. In this case the cam 30 of the brake switch 25 is rotated to open the circuit including the resilient strips 27 and 28 and to close the circuit including the resilient strips 28 and 29. Movement of the resilient strip 28 thus breaks the yellow warning light circuit and closes the stop light circuit comprising the battery 106, conductor 107, resilient strips 28 and 29 and the conductor 114 connected to the red danger or stop light 92. The stop light circuit does not include the motion responsive switch 35 and therefore the stop light or red danger signal is provided as soon as the brake is applied whether the vehicle is in motion or standing still.

Assuming that, as another set of conditions, the operator's foot is on the accelerator and not on the brake pedal. The cam 30 of the brake switch 25 would be in the position shown, and the cam 17 of the accelerator switch 4 would be rotated moving the resilient strip 6 from contact with resilient strip 7 to contact with resilient strip 5. Under this set of facts the car is either accelerating, traveling at a constant speed or decelerating slightly but still under power. The signal then provided is the green safe to advance lamp 93. The circuit in operation is then the lamp 93, the conductor 115, the resilient strips 5 and 6 of the accelerator switch 4, the conductor 109 to the motion responsive switch 35, the conductor 108, the engaging resilient strips 27 and 28 of the brake switch 25 and the conductor 107 to the battery 106. The green light thus provided indicates to the driver of the following vehicle that the driver of the vehicle ahead is not anticipating stopping.

Assuming for the purpose of further describing the operation that the accelerator is depressed even though the vehicle is standing still. The motion responsive switch 35 will be open and the green light circuit then broken. Thus, according to this invention the green light signal is never given unless the car is underway and it is safe for the following driver to proceed with safety.

Taken as a whole, the operation then is as follows: Assuming the car is being normally driven the tail light and the green safety light 93 are burning. Should the operator of the vehicle remove his foot from the accelerator the green safe to advance light 93 goes out and the yellow warning light 91 is lighted. Should the operator then put on the brake the yellow warning light 91 goes out and the red danger or stop light 92 is lighted. The operation of the motion responsive switch 35 is such that neither the yellow warning light 91 nor the green safety light 93 will provide an indication while the vehicle is stopped.

While the foregoing specification describes the invention as applied to an automotive vehicle and the drawings show a conventional automobile structure it is contemplated that it apply to any vehicle to which the signaling system might be applied. It is also further contemplated that the accelerator and brake switches be operated, if desirable, by hand operated, rather than foot operated accelerators and brakes. I therefore do not wish to be limited except by the scope of the following claims.

I claim:

1. In an automotive vehicle having accelerator mechanism and brake mechanism, a signaling system for the benefit of a following vehicle comprising a motion responsive switch opened while the vehicle is at rest, means responsive to the forward movement of the vehicle for closing said switch, caution and go signaling circuits having distinctive indicators and including said motion responsive switch, and accelerator and brake mechanism actuated switches in said caution and go circuits for controlling the same, said brake mechanism actuated switch being closed as to both caution and go signaling circuits when said brake mechanism is inactive and open as to both caution and go signaling circuits when said brake mechanism is active, said accelerator mechanism actuated switch being open as to said go signaling circuit when said accelerator mechanism is retarded and closed as to said go signaling circuit when said accelerator mechanism is advanced, and said accelerator mechanism actuated switch being closed as to said caution signaling circuit when said accelerator mechanism is retarded and open to said caution signaling circuit when said accelerator mechanism is advanced.

2. In an automotive vehicle having accelerator mechanism and brake mechanism, a signaling system for the benefit of the operator of a following vehicle comprising a motion responsive switch opened while the vehicle is at rest, means responsive to the forward movement of the vehicle for closing said switch, accelerator and brake mechanism actuated switches, a go signaling circuit including said motion controlled switch and said accelerator mechanism actuated switch, said go signaling circuit being closed when the accelerator is advanced and the vehicle is under motion, a caution signaling circuit including said motion controlled switch and said accelerator mechanism actuated switch, said caution signaling circuit being closed when the accelerator is retarded and the vehicle is under motion, a stop signaling circuit including said brake mechanism actuated switch, said stop signaling circuit being closed when the brake is applied, said go, caution and stop signaling circuits having distinctive indicators.

3. The invention as set forth in claim 2 wherein the brake mechanism actuated switch is included in said go and caution signaling circuits and opens said circuits when the brake is applied and means connecting said stop, caution and go circuits whereby only one of said last named circuits is closed at one time.

4. In an automotive vehicle having accelerator mechanism, a signaling system for the benefit of the operator of a following vehicle comprising a motion responsive switch, means synchronized with the forward movement of the vehicle for opening said switch when the vehicle is stopped and closing the same when the vehicle is under motion, accelerator mechanism actuated switch, and a caution signaling circuit having a distinctive indicator and including said motion responsive switch and said accelerator mechanism actuated switch, closed when the vehicle is under motion and the accelerator retarded and opened when the vehicle is under motion and the accelerator advanced, said circuit being open when the vehicle is stopped.

ELMER J. SEIDEN.